United States Patent
Morita (10) Patent No.: US 7,984,307 B2
(45) Date of Patent: Jul. 19, 2011

(54) DATA TRANSMISSION APPARATUS, CONTROL METHOD THEREFOR, AND PROGRAM

(75) Inventor: Hiroyasu Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 948 days.

(21) Appl. No.: 11/318,149

(22) Filed: Dec. 23, 2005

(65) Prior Publication Data

US 2006/0143479 A1 Jun. 29, 2006

(30) Foreign Application Priority Data

Dec. 27, 2004 (JP) .................................. 2004-377246

(51) Int. Cl.
*G06F 11/30* (2006.01)
*G06F 12/14* (2006.01)

(52) U.S. Cl. ........................................................ 713/193
(58) Field of Classification Search .................... 713/193
See application file for complete search history.

(56) References Cited

U.S. PATENT DOCUMENTS

| | | | | |
|---|---|---|---|---|
| 5,995,723 A | * | 11/1999 | Sperry et al. | 358/1.15 |
| 6,615,353 B1 | * | 9/2003 | Hashiguchi | 713/185 |
| 6,978,299 B1 | * | 12/2005 | Lodwick | 709/223 |
| 2004/0021903 A1 | * | 2/2004 | Wanda | 358/1.15 |
| 2005/0154884 A1 | * | 7/2005 | Van Den Tillaart | 713/165 |

FOREIGN PATENT DOCUMENTS

| JP | 06-242665 | * | 6/1994 |
|---|---|---|---|
| JP | 08-107486 A | | 4/1996 |
| JP | 2002-271553 | | 9/2002 |

OTHER PUBLICATIONS

The above reference was cited in a Oct. 23, 2009 Japanese Office Action that issued in Japanese Patent Application No. 2004-377246, which is enclosed without English Translation.

* cited by examiner

*Primary Examiner* — Kambiz Zand
*Assistant Examiner* — Stephen Sanders
(74) *Attorney, Agent, or Firm* — Cowan, Liebowitz & Latman, P.C.

(57) ABSTRACT

A read document image is stored in a storage apparatus. The destination of data to be transmitted is set, and the data is transmitted to the destination. If transmission fails, the data is discarded on the basis of settings of the data.

6 Claims, 7 Drawing Sheets

DATA TRANSMISSION APPARATUS, CONTROL METHOD THEREFOR, AND PROGRAM

FIELD OF THE INVENTION

The present invention relates to a data transmission apparatus which designates a destination to which data stored in a storage apparatus is to be transmitted, and controls transmission of the data to the destination, a control method therefor, and a program.

BACKGROUND OF THE INVENTION

There has conventionally been proposed a system which uses a designated image file format to transmit, to a designated destination, an image read from a document by an image input apparatus such as a scanner or an image received by the reception unit of the system.

An example of the system is a multi-functional peripheral having transmission and reception units. In the multi-functional peripheral, when an image read by a scanner is to be transmitted, the image is converted into a proper image file format designated by the user. Examples of the file format are TIFF, JFIF, and PDF. In terms of security, an image is sometimes encrypted and transmitted in accordance with a user instruction. For example, an image is transmitted using a PDF encryption function (e.g., Japanese Patent Laid-Open No. 2002-271553).

Most multi-functional peripherals also have a function of storing, in, e.g., an internal storage apparatus, an image which has failed in transmission or a transmitted image in accordance with a cancel instruction by the user, and transmitting the image to another destination in accordance with a user instruction. With this function, an image which has failed in transmission owing to disconnection from the network, a server problem, or the like can be transmitted to another destination without reading the image again.

According to the prior art, however, a change of the transmission destination of an image stored in the internal storage apparatus of the multi-functional peripheral is based on a transmission instruction designated by the user, and change operation is not limited. Operation of changing the transmission destination can be performed by any user who uses the multi-functional peripheral.

By destination change operation by another user, an image may be transmitted to a destination not intended by a user who has input a transmission job. In this case, a transmission job which has undergone encryption processing in transmission cannot be decrypted even if it is transmitted to an unintended destination. However, a transmission job which does not undergo any encryption processing may allow a third party to see its transmission contents. This impairs the security of an image.

SUMMARY OF THE INVENTION

The present invention has been made to overcome the conventional drawbacks, and has as its object to provide a data transmission apparatus capable of safely, efficiently controlling retransmission of data when the data is retransmitted, a control method therefor, and a program.

According to the present invention, the foregoing object is attained by providing a data transmission apparatus comprising:

an input unit adapted to input data;
an encryption unit adapted to encrypt the data input by the input unit;
a storage unit adapted to store the data input by the input unit after the data is encrypted by the encryption unit or without encrypting the data;
a transmission unit adapted to transmit the data stored in the storage unit to a designated destination; and
a control unit adapted to, when the transmission unit fails in transmitting the data stored in the storage unit, control to keep storing the data in the storage unit when the data has been encrypted by the encryption unit, and invalidate the data when the data has not been encrypted by the encryption unit.

According to the present invention, the foregoing object is attained by providing, a transmission apparatus comprising:

an input unit adapted to input data;
an encryption unit adapted to encrypt the data input by the input unit;
a storage unit adapted to store the data input by the input unit, together with destination information after the data is encrypted by the encryption unit or without encrypting the data;
a transmission unit adapted to transmit the data stored in the storage unit, in accordance with the destination information;
an instruction unit adapted to designate a change of the destination information of the data stored in the storage unit; and
a control unit adapted to control whether to permit the change of the destination information by the instruction unit in accordance with whether the data stored in the storage unit has been encrypted by the encryption unit.

In a preferred embodiment, the control unit inhibits the change of the destination information by the instruction unit when the data stored in the storage unit has not been encrypted by the encryption unit.

According to the present invention, the foregoing object is attained by providing a data transmission apparatus comprising:

an input unit adapted to input data;
a storage unit adapted to store the data input by the input unit, together with destination information in correspondence with information for specifying a sender;
a transmission unit adapted to transmit the data stored in the storage unit, in accordance with the destination information;
an instruction unit adapted to designate a change of the destination information of the data stored in the storage unit; and
a control unit adapted to control to permit the change of the destination information by the instruction unit when a user who designates the change of the destination information by the instruction unit coincides with the sender who corresponds to the data stored in the storage unit.

In a preferred embodiment, the apparatus further comprises an encryption unit adapted to encrypt the data input by the input unit, wherein when the data stored in the storage unit has been encrypted by the encryption unit, the control unit permits the change of the destination information by the instruction unit even when the user who designates the change of the destination information by the instruction unit does not coincide with the sender who corresponds to the data stored in the storage unit.

According to the present invention, the foregoing object is attained by providing a method of controlling a data transmission apparatus which has a storage unit for storing data and transmits data stored in the storage unit, comprising:

an input step of inputting data;

an encryption step of encrypting the data input in the input step;

a storage step of storing, in the storage unit, the data input in the input step after the data is encrypted in the encryption step or without encrypting the data;

a transmission step of transmitting the data stored in the storage unit to a designated destination; and a control step of, when transmission of the data stored in the storage unit fails in the transmission step, controlling to keep storing the data in the storage unit when the data has been encrypted in the encryption step, and invalidate the data when the data has not been encrypted in the encryption step.

According to the present invention, the foregoing object is attained by providing a method of controlling a data transmission apparatus which has a storage unit for storing data and transmits data stored in the storage unit, comprising:

an input step of inputting data;

an encryption step of encrypting the data input in the input step;

a storage step of storing the data input in the input step, in the storage unit, together with destination information after the data is encrypted in the encryption step or without encrypting the data;

a transmission step of transmitting the data stored in the storage unit, in accordance with the destination information;

an instruction step of designating a change of the destination information of the data stored in the storage unit; and a control step of controlling whether to permit the change of the destination information in the instruction step in accordance with whether the data stored in the storage unit has been encrypted in the encryption step.

According to the present invention, the foregoing object is attained by providing a method of controlling a data transmission apparatus which has a storage unit for storing data and transmits data stored in the storage unit, comprising:

an input step of inputting data;

a storage step of storing the data input in the input step, together with destination information in correspondence with information for specifying a sender;

a transmission step of transmitting the data stored in the storage unit, in accordance with the destination information;

an instruction step of designating a change of the destination information of the data stored in the storage unit; and a control step of controlling to permit the change of the destination information in the instruction step when a user who designates the change of the destination information in the instruction step coincides with the sender who corresponds to the data stored in the storage unit.

According to the present invention, the foregoing object is attained by providing a program for implementing control of a data transmission apparatus which has a storage unit for storing data and transmits data stored in the storage unit, comprising:

a program code for an input step of inputting data;

a program code for an encryption step of encrypting the data input in the input step;

a program code for a storage step of storing, in the storage unit, the data input in the input step after the data is encrypted in the encryption step or without encrypting the data;

a program code for a transmission step of transmitting the data stored in the storage unit to a designated destination; and a program code for a control step of, when transmission of the data stored in the storage unit fails in the transmission step, controlling to keep storing the data in the storage unit when the data has been encrypted in the encryption step, and invalidate the data when the data has not been encrypted in the encryption step.

According to the present invention, the foregoing object is attained by providing a program for implementing control of a data transmission apparatus which has a storage unit for storing data and transmits data stored in the storage unit, comprising:

a program code for an input step of inputting data;

a program code for an encryption step of encrypting the data input in the input step;

a program code for a storage step of storing the data input in the input step, in the storage unit, together with destination information after the data is encrypted in the encryption step or without encrypting the data;

a program code for a transmission step of transmitting the data stored in the storage unit, in accordance with the destination information;

a program code for an instruction step of designating a change of the destination information of the data stored in the storage unit; and a program code for a control step of controlling whether to permit the change of the destination information in the instruction step in accordance with whether the data stored in the storage unit has been encrypted in the encryption step.

According to the present invention, the foregoing object is attained by providing a program for implementing control of a data transmission apparatus which has a storage unit for storing data and transmits data stored in the storage unit, comprising:

a program code for an input step of inputting data;

a program code for a storage step of storing the data input in the input step, together with destination information in correspondence with information for specifying a sender;

a program code for a transmission step of transmitting the data stored in the storage unit, in accordance with the destination information;

a program code for an instruction step of designating a change of the destination information of the data stored in the storage unit; and a program code for a control step of controlling to permit the change of the destination information in the instruction step when a user who designates the change of the destination information in the instruction step coincides with the sender who corresponds to the data stored in the storage unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
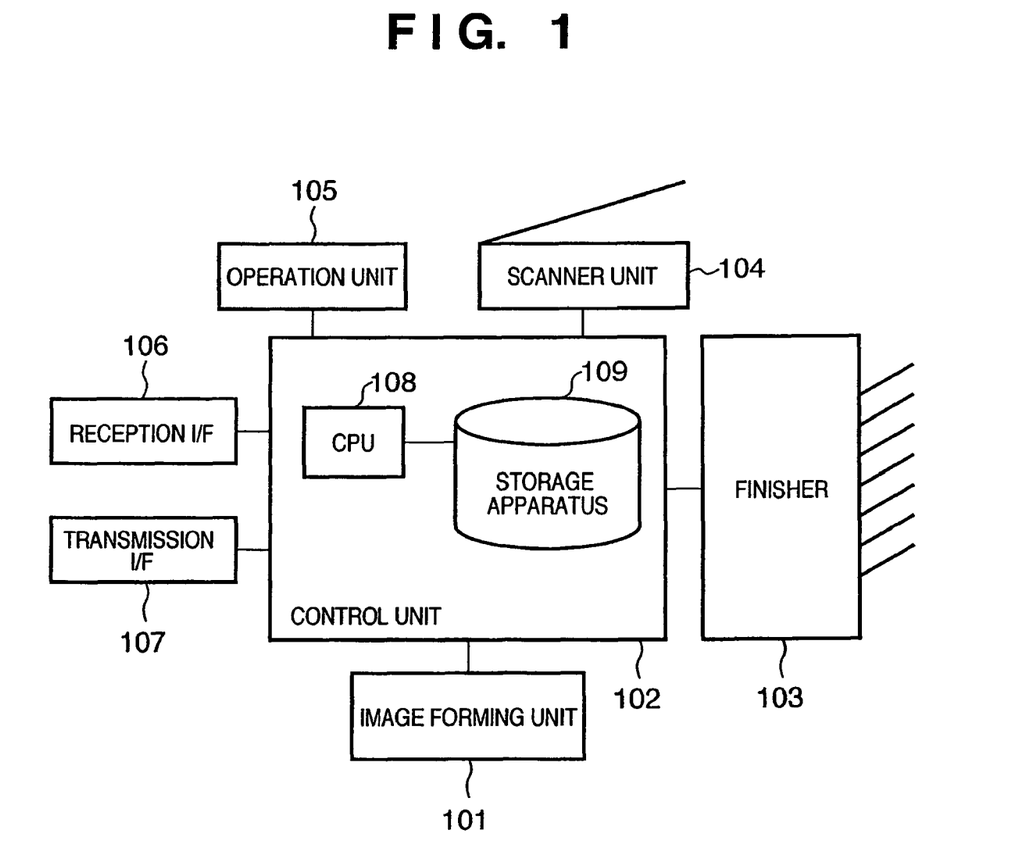
FIG. 1 is a block diagram showing the configuration of a multi-functional peripheral according to the first embodiment of the present invention.

FIG. 1 is a block diagram showing the configuration of a multi-functional peripheral according to the first embodiment of the present invention.

The multi-functional peripheral comprises an image forming unit 101, control unit 102, finisher 103, scanner unit 104, operation unit 105, a plurality of reception interfaces (I/Fs) 106, and a plurality of transmission interfaces (I/Fs) 107. The building components except the control unit 102 are connected to the control unit 102 via dedicated interfaces. The main part of the control unit 102 is made up of a CPU 108 and storage apparatus 109.

A document is set on the scanner unit 104. Alternatively, an image (including an image formed from a photo, graphic, and the like and an image formed from a text, graphic, and the like) which has already been saved in the storage apparatus 109 is designated from the operation unit 105. A transmission destination is selected from the operation unit 105 to designate transmission. A transmission application implemented by the control of the CPU 108 performs image conversion necessary for each image in transmission.

In addition to the CPU 108 and storage apparatus 109, the control unit 102 comprises a ROM which stores data such as various control programs and parameters for controlling the whole multi-functional peripheral, and a RAM functioning as a work area and temporary save area for data. Processes which can be implemented by the multi-functional peripheral under the control of the CPU 108 are a document reading function, a data transmission/reception function, a data storage function, and various image processing functions (e.g., encryption, tone conversion, file format conversion).

A typical example of the storage apparatus 109 is a large-capacity storage apparatus (e.g., hard disk drive) capable of storing a large number of images. The image forming unit 101 can adopt various methods (e.g., larger beam method, inkjet method, and thermal transfer method) as image forming methods.

The reception I/Fs 106 and transmission I/Fs 107 are formed from various interfaces (e.g., a network interface, USB interface, IEEE1394 interface, and telephone line interface).

The operation unit 105 may be made up of a display unit (LCD or LED), key input unit, and button unit, or formed from a touch panel.

The finisher 103 executes various post-processes such as punching and stapling for a printout from the image forming unit 101. The scanner unit 104 is a reading unit capable of color/monochrome read, and may be equipped with an auto document feeder (ADF), as needed.

A network connected to the multi-functional peripheral is a so-called communication network which is implemented typically by one or a combination of the Internet, a LAN, a WAN, a telephone line, a dedicated digital line, an ATM, a frame relay line, a communication satellite channel, a cable television line, and a data broadcasting radio channel. The network is arbitrary as far as data can be transmitted and received.

Processing executed by the multi-functional peripheral according to the first embodiment will be explained with reference to FIG. 2.

Figure 2:
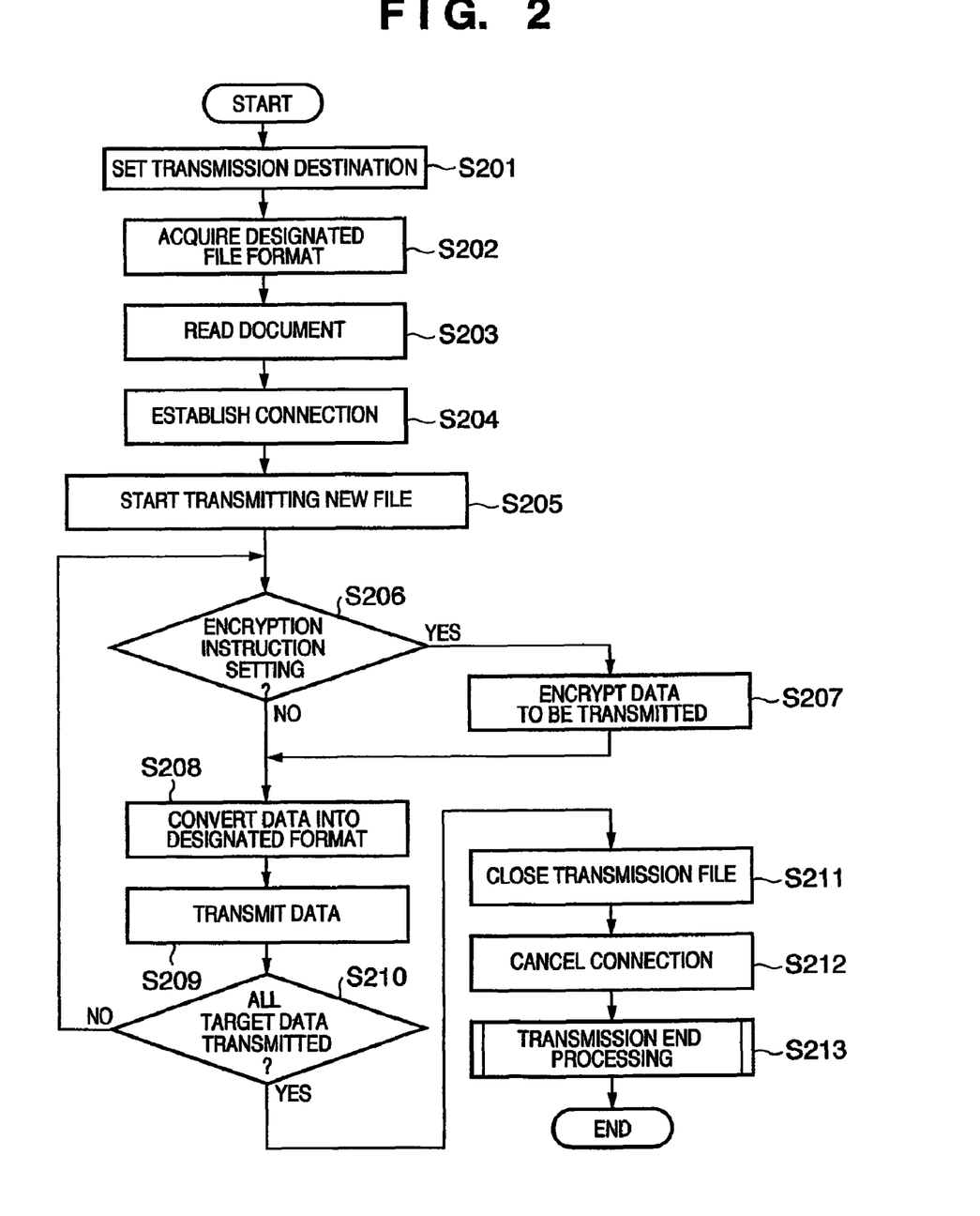
FIG. 2 is a flowchart showing processing executed by the multi-functional peripheral according to the first embodiment of the present invention.

FIG. 2 is a flowchart showing processing executed by the multi-functional peripheral according to the first embodiment of the present invention.

Note that processing in FIG. 2 is implemented by, e.g., the control of the CPU 108.

The transmission destination of an image to be transmitted that is set from the operation unit 105 is acquired (step S201). The transmission file format of the image that is set from the operation unit 105 is acquired (step S202). A set document is read by the scanner unit 104. A read document image (data to be transmitted), and its attribute information (e.g., layout information, an identification number for identifying the read image, destination information, user information, and clear setting information) are stored in the storage apparatus 109 (S203).

After the document is read in step S203, a communication connection with the transmission destination designated in step S201 is established via the transmission I/F 107 (step S204). A new file of the image to be transmitted is created, and transmission of the file to the transmission destination starts (step S205).

Examples of the transmission destination are a file server, database server, personal computer, facsimile apparatus, and storage server which are connected to the multi-functional peripheral via the network.

In step S206, it is determined whether an encryption instruction setting of the file in transmission has been made.

The encryption instruction setting can be input via, e.g., the operation unit 105. Various operations associated with the multi-functional peripheral and various settings associated with transmission including the encryption instruction setting can be implemented via, e.g., a GUI which is displayed on the display unit of the operation unit 105. The GUI can be implemented by the same configuration as that installed in a general-purpose multi-functional peripheral, and details thereof will be omitted.

If the encryption instruction setting is detected in step S206 (YES in step S206), data (e.g., image) to be transmitted is encrypted (step S207). If no encryption instruction setting is detected (NO in step S206), the data is converted into the designated file format (step S208). When the encryption instruction setting has been made, the encrypted data is converted into the designated file format.

The data to be transmitted that has been converted into the designated file format is transmitted to the designated transmission destination via the transmission I/F 107 (step S209).

Note that data to be transmitted may be images of a plurality of pages, or a plurality of image files. Various forms are assumed in accordance with the form of data stored in the storage apparatus 109. In the first embodiment, for example, when the document image of a document read by the scanner unit 104 is data to be transmitted, processing from steps S206 to S210 is repeated by the number of document pages read by the scanner unit 104.

In step S210, it is determined whether all target data have been transmitted (step S210). If all target data have not been transmitted (NO in step S210), the flow returns to step S206 to execute processing for the next data to be transmitted. If all target data have been transmitted (YES in step S210), the created transmission file is closed (step S211).

The connection established in step S204 is canceled (step S212). Then, transmission end processing is executed (step S213).

Details of transmission end processing in step S213 will be explained with reference to FIG. 3.

Figure 3:
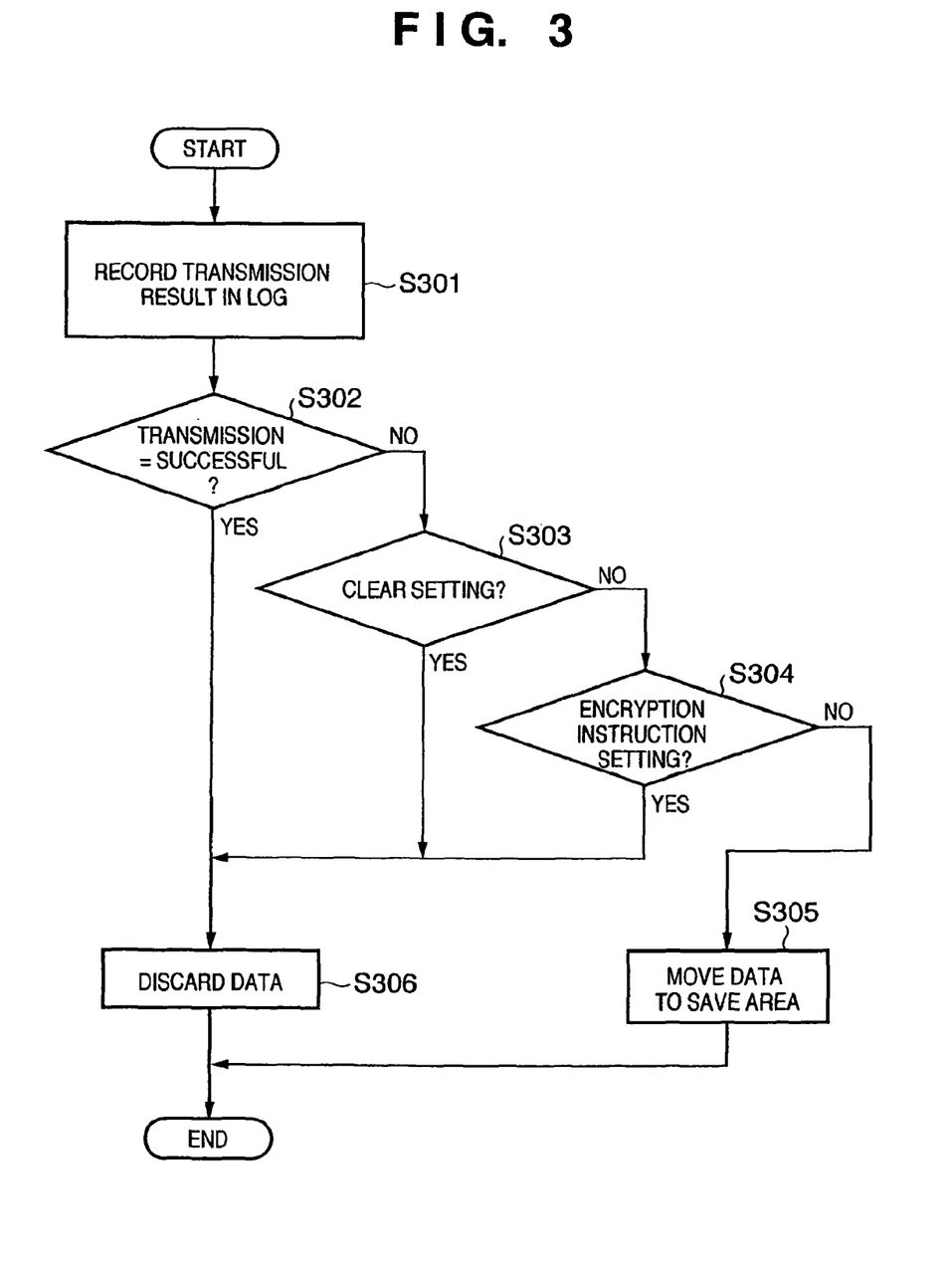
FIG. 3 is a flowchart showing details of transmission end processing according to the first embodiment of the present invention.

FIG. 3 is a flowchart showing details of transmission end processing according to the first embodiment of the present invention.

A transmission result is recorded as log data in a log data storage area ensured in the storage apparatus 109 (step S301). It is determined whether transmission processing is successful (step S302). If transmission processing is successful (YES in step S302), an image corresponding to the transmitted data and attribute information of the image that are stored in the storage apparatus 109 are discarded, and processing ends (step S306).

If transmission processing has failed (NO in step S302), i.e., transmission processing results in a transmission error, it is determined whether a clear setting of corresponding data to be transmitted has been made.

The clear setting is used to determine whether to delete, from the storage apparatus 109, data to be transmitted that results in a transmission error when transmission processing fails. The clear setting may be applied via the operation unit 105 in advance to all data to be transmitted or individually to data to be transmitted every time transmission operation is done. Clear setting information representing the contents of the clear setting are saved as attribute information of data to be transmitted in the storage apparatus 109 in association with the data.

If the clear setting is detected in step S303 (YES in step S303), the data to be transmitted that results in a transmission error is deleted from the storage apparatus 109 (step S306). If no clear setting is detected (NO in step S303), it is determined whether the encryption instruction setting has been made for the data (step S304).

If no encryption instruction setting is detected (YES in step S304), the data to be transmitted that results in a transmission error is deleted from the storage apparatus 109 (step S306). If the encryption instruction setting is detected (NO in step S304), the data that results in a transmission error is moved to a save area for transmission error save/transmission standby in the storage apparatus 109, and processing ends (S305).

As described above, according to the first embodiment, when no encryption instruction setting is made for data to be transmitted, the data that results in a transmission error is deleted from the storage apparatus 109 in order to inhibit retransmission of the data next time.

When data to be transmitted fails in transmission and is transmitted again, it can be prevented to transmit the data to an unintended destination without encrypting the data.

Second Embodiment

In the first embodiment, data to be transmitted that results in a transmission error is deleted from the storage apparatus 109 unless the encryption instruction setting is made for the data. In contrast, according to the second embodiment, even when no encryption instruction setting is made for data to be transmitted, the data that results in a transmission error is not deleted from a storage apparatus 109 but is kept stored in the storage apparatus 109. While giving a retransmission chance to retransmit the data to the same destination or a destination change/transmission chance to change the destination and transmit the data, whether to execute retransmission or destination change/transmission is controlled. The second embodiment will describe this configuration.

In the second embodiment, in order to improve security, whether the encryption instruction setting has been made is determined when data to be transmitted that results in a transmission error is to be transmitted again to the same destination (retransmission operation), or the transmission destination is changed and data is to be transmitted (destination change/transmission operation). If it is determined that no encryption instruction setting has been made and the transmission destination is identical to the previous transmission destination, i.e., retransmission operation is to be executed, retransmission of the data is permitted. If it is determined that no encryption instruction setting has been made and the transmission destination is different from the previous transmission destination, i.e., destination change/transmission operation is to be executed, retransmission of the data is inhibited.

That is, when no encryption instruction has been issued, retransmission to the same destination is permitted, but transmission to a changed destination is inhibited. This can prevent transmission of unencrypted data to an unintended destination. In addition, retransmission to the same destination is permitted, providing a more user-friendly transmission environment.

Transmission end processing in the second embodiment will be will be explained with reference to FIG. 4.

Figure 4:
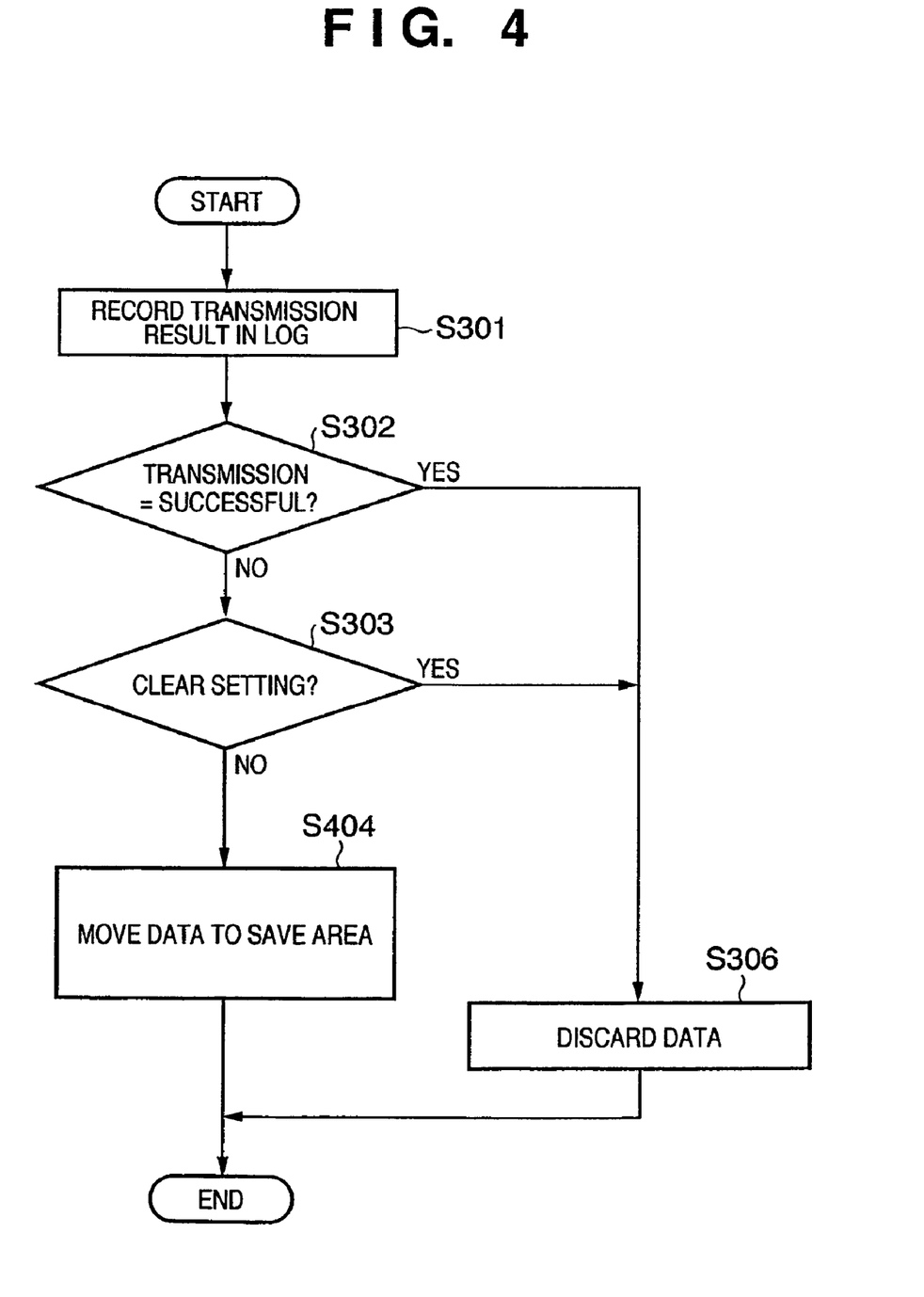
FIG. 4 is a flowchart showing details of transmission end processing according to the second embodiment of the present invention.

FIG. 4 is a flowchart showing details of transmission end processing according to the second embodiment of the present invention.

In FIG. 4, the same step numbers as in FIG. 3 of the first embodiment denote the same processes, and details thereof will be omitted.

In the second embodiment, even when transmission processing fails, i.e., transmission processing results in a transmission error and no clear setting of corresponding data to be transmitted has been made, the data that results in the transmission error is stored in the storage apparatus 109 by moving the data to the save area for transmission error save/transmission standby regardless of whether the encryption instruction setting has been made for the data (step S404).

With this setting, even when data to be transmitted without any encryption instruction setting results in a transmission error, the user can get a chance to transmit the data again. In this retransmission, whether to permit/inhibit transmission is controlled in accordance with the destination.

This retransmission processing will be explained with reference to FIG. 5.

Figure 5:
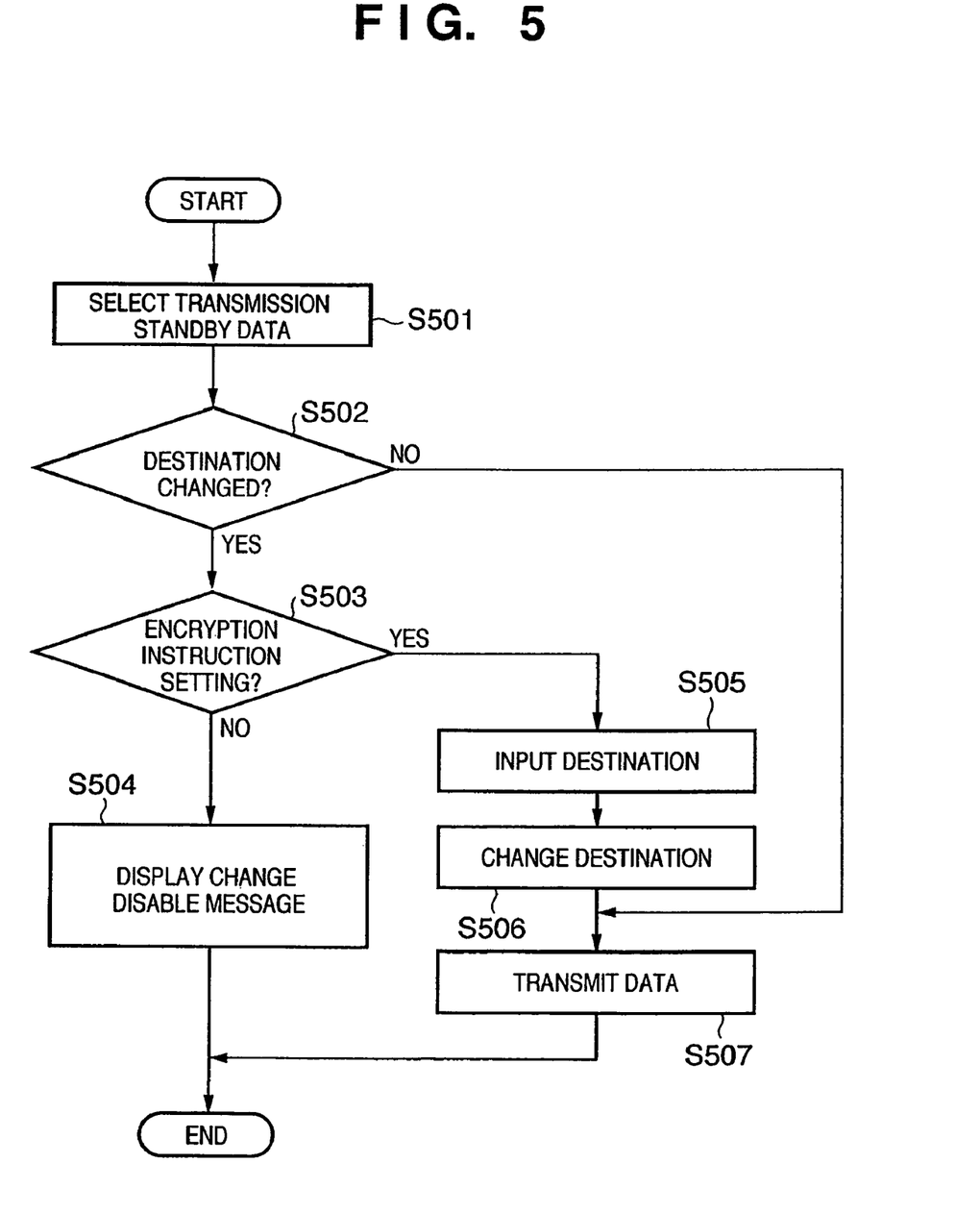
FIG. 5 is a flowchart showing retransmission processing according to the second embodiment of the present invention.

FIG. 5 is a flowchart showing retransmission processing according to the second embodiment of the present invention.

Transmission standby data which is to be retransmitted or transmitted after changing the destination is selected (step S501). This selection is implemented by reading out transmission standby data from the save area of the storage apparatus 109, displaying a list of the data on, e.g., the display unit of an operation unit 105, and prompting the user to select data from the list.

It is determined whether an instruction to the data to be transmitted is a destination change instruction (step S502). If the instruction is not a change of the destination (NO in step S502), i.e., the destination is identical to the previous one, the data is transmitted to the designated destination, and processing ends (step S507).

If the instruction is a change of the destination (YES in step S502), it is determined whether the encryption instruction setting has been made (step S503). If no encryption instruction setting has been made (NO in step S503), a destination change disable message that destination change/transmission is inhibited is displayed on the display unit of the operation unit 105.

If the encryption instruction setting has been made (YES in step S503), a destination designation window is displayed on the display of the operation unit 105 to accept a destination input (step S505). The destination is changed in accordance with the input via the operation unit 105 (step S506).

As described above, according to the second embodiment, whether to permit/inhibit retransmission is controlled on the basis of the retransmission destination even when no encryption instruction setting is made for data to be transmitted that results in a transmission error. Especially when the retransmission destination is identical to the transmission destination, retransmission is permitted. When the retransmission destination is different, retransmission to the changed destination is inhibited.

In addition to the effects described in the first embodiment, the second embodiment can provide a more flexible transmission environment to the user.

Third Embodiment

The third embodiment configures a user authentication function of performing user authentication in the use of an apparatus. In addition, data to be transmitted that results in a transmission error is not deleted from a storage apparatus 109, but is kept stored in the storage apparatus 109. While giving a retransmission chance to retransmit the data to the same destination, or a destination change/transmission chance to change the destination and transmit the data, whether to execute retransmission or destination change/transmission is controlled. The third embodiment will describe this configuration.

In the third embodiment, when a user who has input a transmission job for destination change/transmission is identical to a user in previous transmission, destination change/transmission is permitted. This can improve user friendliness while maintaining security.

Processing executed by a multi-functional peripheral according to the third embodiment will be explained with reference to FIG. 6.

Figure 6:
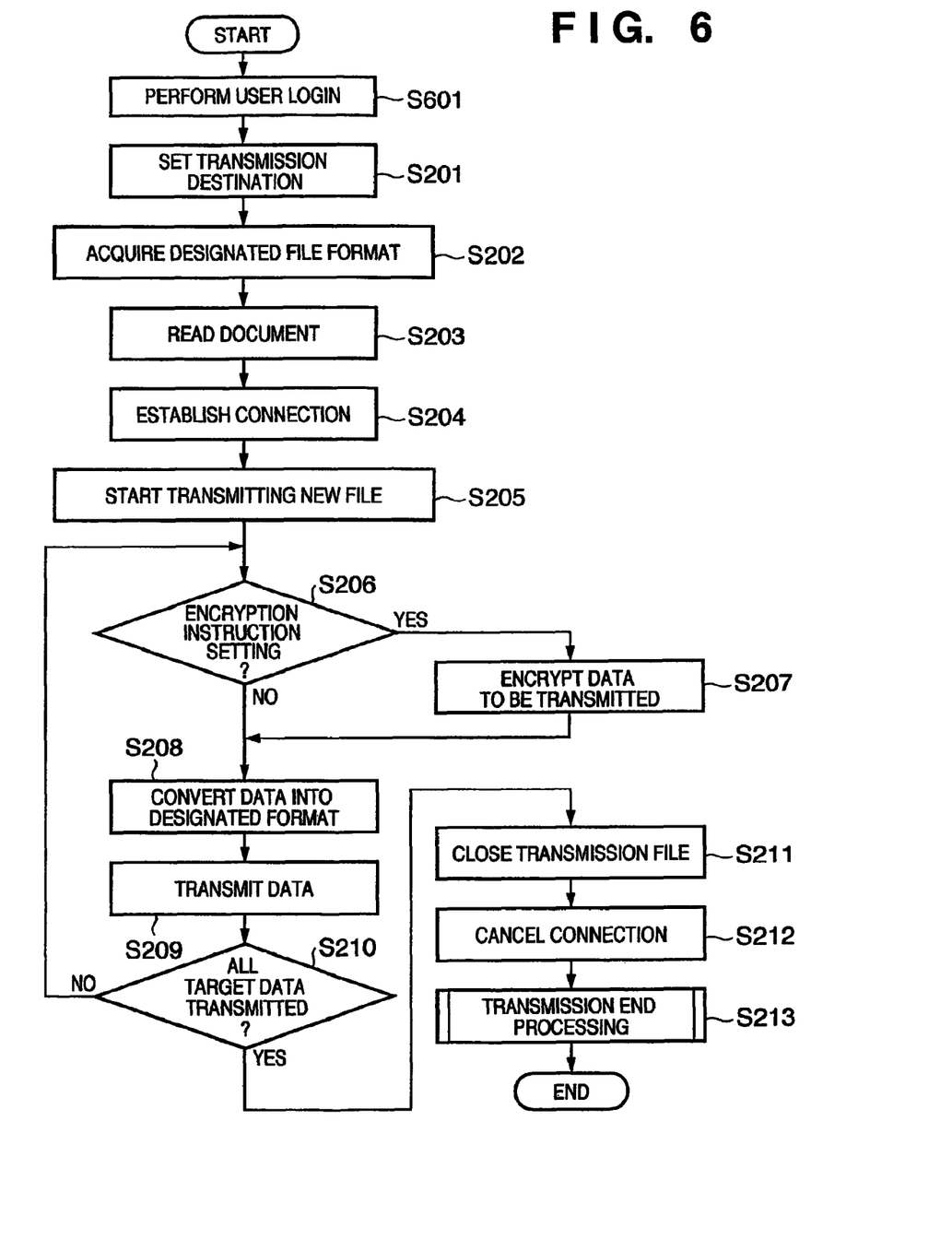
FIG. 6 is a flowchart showing processing executed by the multi-functional peripheral according to the third embodiment of the present invention.

FIG. 6 is a flowchart showing processing executed by the multi-functional peripheral according to the third embodiment of the present invention.

In FIG. 6, the same step numbers as in FIG. 2 of the first embodiment denote the same processes, and details thereof will be omitted.

User login processing is executed via an operation unit 105 (step S601).

Note that login processing is implemented by displaying a login window on the display unit of the operation unit 105 and inputting on the login window a user name and user authentication information such as a password which has been made to correspond to the user name in advance.

After that, processing from steps S202 to S213 is executed.

Transmission end processing in the third embodiment is the same as that in the second embodiment.

Retransmission processing in the third embodiment will be explained with reference to FIG. 7.

Figure 7:
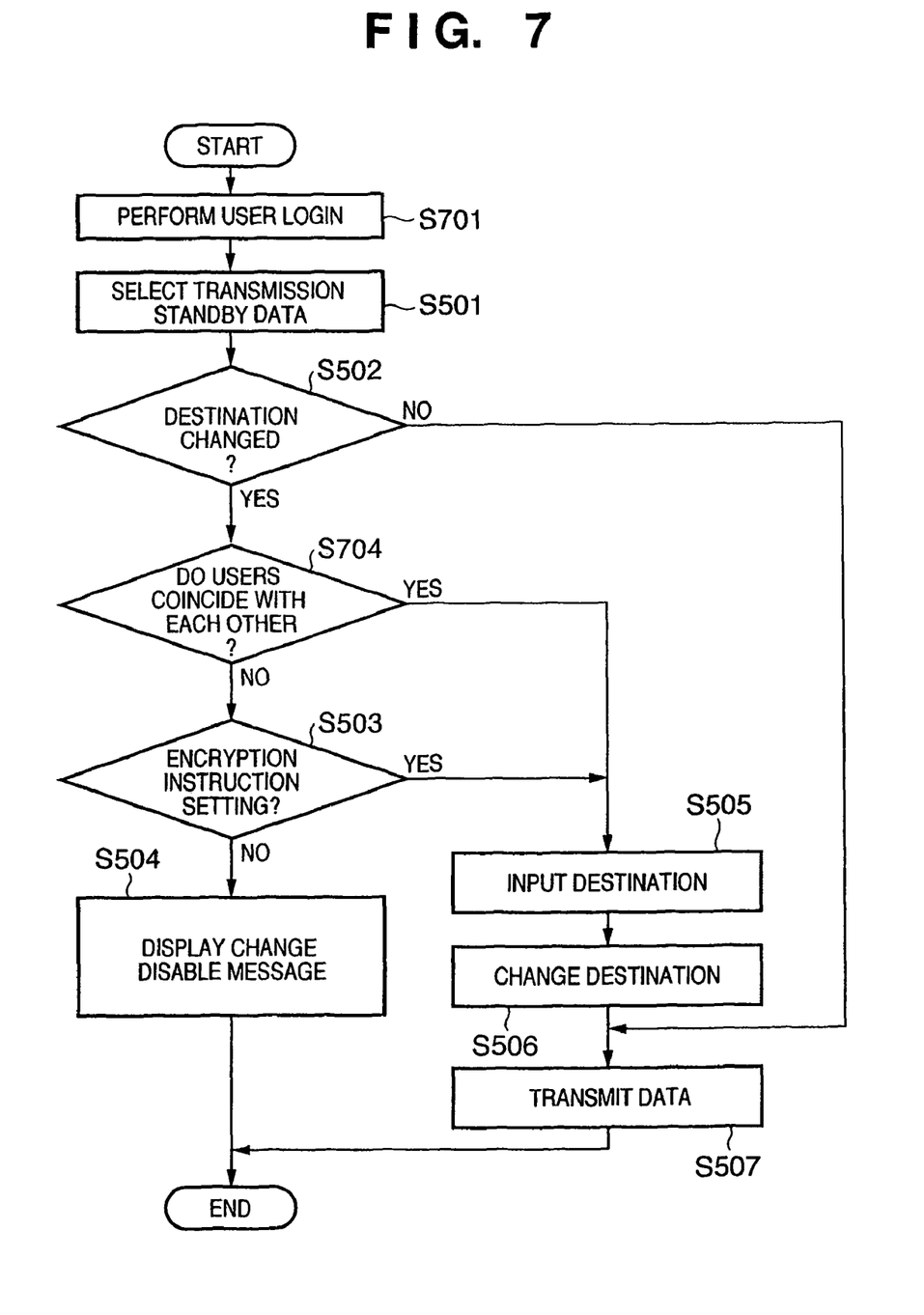
FIG. 7 is a flowchart showing retransmission processing according to the third embodiment of the present invention.

FIG. 7 is a flowchart showing retransmission processing according to the third embodiment of the present invention.

In FIG. 7, the same step numbers as in FIG. 5 of the second embodiment denote the same processes, and details thereof will be omitted.

User login processing is executed via the operation unit 105 (step S701). If it is determined in step S502 through processing in step S501 that the destination has been changed (YES in step S502), it is determined whether login users coincide with each other (step S704).

This determination is made by comparing user information in attribute information of data to be transmitted with user information obtained by login processing in step S701.

If the login users coincide with each other (YES in step S704), processing in steps S505 to S507 is executed. If the login users do not coincide with each other (NO in step S704), step S503 is executed.

Processing in step S504 or in steps S505 to S507 is executed on the basis of the determination result of step S503.

As described above, according to the third embodiment, when destination change/transmission is designated for data to be transmitted that results in a transmission error, whether to permit/inhibit destination change/transmission is controlled on the basis of a user who performs transmission operation to the retransmission destination. When a user who has performed transmission operation to the previous transmission destination coincides with a user who is to perform transmission operation to the retransmission destination for the same data, destination change/transmission is permitted. When a user who has performed transmission operation to the previous transmission destination is different from a user who is to perform transmission operation to the retransmission destination for the same data, destination change/transmission is inhibited.

For data to be transmitted with the encryption instruction setting, destination change/transmission is permitted even if a user who has performed transmission operation to the previous transmission destination is different from a user who is to perform transmission operation to the retransmission destination. Accordingly, user friendliness can be maintained.

In addition to the effects described in the first and second embodiments, the third embodiment can provide a more flexible transmission environment to the user.

Note that the configurations of the first to third embodiments are merely an example. Control contents to control whether to permit/inhibit save of data to be transmitted that results in a transmission error, and control contents to control whether to permit/inhibit destination change/transmission after the data that results in a transmission error is saved can be defined in accordance with the application purpose.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2004-377246, filed on Dec. 27, 2004, which is hereby incorporated by reference herein in its entirety.

What is claimed is:

1. A data transmission apparatus comprising:
an input unit configured to input data;
an encryption unit configured to encrypt the data input by said input unit;
a storage unit configured to store the data input by said input unit, together with destination information after the data is encrypted by said encryption unit or without encrypting the data;
a transmission unit configured to transmit the data stored in said storage unit, in accordance with the destination information;
a selection unit configured to select one of the data stored in said storage unit;
a determination unit configured to determine whether or not the data selected by said selection unit is encrypted; and
a control unit configured to, based on a result of the determination by said determination unit, permit a change of the destination information of the data selected by said selection unit, if it is determined that the data selected by selection unit is encrypted, and restrict the change of the destination information of the data selected by said selection unit, but to permit the transmission of the data selected by said selection unit unless the destination information is changed, if it is determined that the data selected by said selection unit is not encrypted.

2. A method of controlling a data transmission apparatus which has a storage unit for storing data and transmits data stored in the storage unit, comprising:
an input step of inputting data;
an encryption step of encrypting the data input in the input step;
a storage step of storing the data input in the input step, in the storage unit, together with destination information after the data is encrypted in the encryption step or without encrypting the data;
a transmission step of transmitting the data stored in the storage unit, in accordance with the destination information;
a selection step of selecting one of the data stored in the storage unit;
a determining step of determining whether or not the data selected by said selection step is encrypted; and
a control step of, based on a result of the determination in said determination step, permitting a change of the destination information of the data selected in said selection step, if it is determined that the data selected in said selection unit is encrypted, and restricting the change of the destination information of the data selected in said selection step, but permitting the transmission of the data selected in said selection step unless the destination information is changed, if it is determined that the data selected in said selection step is not encrypted.

3. A program for implementing control of a data transmission apparatus which has a storage unit for storing data and transmits data stored in the storage unit, comprising:
a program code for an input step of inputting data;
a program code for an encryption step of encrypting the data input in the input step;
a program code for a storage step of storing the data input in the input step, in the storage unit, together with destination information after the data is encrypted in the encryption step or without encrypting the data;
a program code for a transmission step of transmitting the data stored in the storage unit, in accordance with the destination information;
a program code for a selection step of selecting one of the data stored in the storage unit;
a program code for a determining step of determining whether or not the data selected by said selection step is encrypted; and
a program code for a control step of, based on a result of the determination in said determination step, permitting a change of the destination information of the data selected in said selection step, if it is determined that the data selected in said selection unit is encrypted, and restricting the change of the destination information of the data selected in said selection step, but permitting the transmission of the data selected in said selection step unless the destination information is changed, if it is determined that the data selected in said selection step is not encrypted.

4. The data transmission apparatus according to claim 1, wherein said storage unit stores the data when the transmission of the data has failed.

5. The method according to claim 2, wherein the data is stored in said storage step when the transmission of the data has failed.

6. The program according to claim 3, wherein the data is stored in said storage step when the transmission of the data has failed.

* * * * *